United States Patent
Vijayasankar et al.

(10) Patent No.: US 9,871,630 B2
(45) Date of Patent: *Jan. 16, 2018

(54) HYBRID COMMUNICATION NETWORKS

(71) Applicant: Texas Instruments Incorporated, Dallas, TX (US)

(72) Inventors: Kumaran Vijayasankar, Allen, TX (US); Ramanuja Vedantham, Allen, TX (US); Anand G. Dabak, Plano, TX (US); Badri N. Varadarajan, Mountain View, CA (US); Il Han Kim, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/557,858

(22) Filed: Dec. 2, 2014

(65) Prior Publication Data
US 2015/0085883 A1    Mar. 26, 2015

Related U.S. Application Data

(63) Continuation of application No. 13/457,612, filed on Apr. 27, 2012, now Pat. No. 8,902,930.
(Continued)

(51) Int. Cl.
*H04W 72/04* (2009.01)
*H04L 5/00* (2006.01)
(Continued)

(52) U.S. Cl.
CPC ............. *H04L 5/0048* (2013.01); *H04B 3/54* (2013.01); *H04B 3/542* (2013.01); *H04L 5/0055* (2013.01);
(Continued)

(58) Field of Classification Search
CPC ..... H04W 74/02; H04W 16/14; H04W 88/06; H04W 28/06; H04W 28/065; H04W 40/22; H04W 48/08; H04W 48/12; H04L 12/413
(Continued)

(56) References Cited

U.S. PATENT DOCUMENTS

| | | | |
|---|---|---|---|
| 2003/0169155 A1* | 9/2003 | Mollenkopf | G02B 6/483 370/277 |
| 2007/0230497 A1* | 10/2007 | Choi | H04B 3/542 370/442 |

(Continued)

*Primary Examiner* — Sai Aung
(74) *Attorney, Agent, or Firm* — Rose Alyssa Keagy; Charles A. Brill; Frank D. Cimino

(57) ABSTRACT

Systems and methods for designing, using, and/or implementing hybrid communication networks are described. In various embodiments, these systems and methods may be applicable to power line communications (PLC). For example, one or more of the techniques disclosed herein may include methods to coordinate medium-to-low voltage (MV-LV) and low-to-low voltage (LV-LV) PLC networks when the MV-LV network operates in a frequency subband mode and the LV-LV network operates in wideband mode (i.e., hybrid communications). In some cases, MV routers and LV routers may have different profiles. For instance, MV-LV communications may be performed using MAC superframe structures, and first-level LV to lower-level LV communications may take place using a beacon mode. Lower layer LV nodes may communicate using non-beacon modes. Also, initial scanning procedures may encourage first-to-second-level LV device communications rather than MV-to-first-level LV connections.

20 Claims, 10 Drawing Sheets

Related U.S. Application Data

(60) Provisional application No. 61/482,298, filed on May 4, 2011.

(51) Int. Cl.
*H04B 3/54* (2006.01)
*H04L 25/02* (2006.01)

(52) U.S. Cl.
CPC .... *H04L 5/0078* (2013.01); *H04B 2203/5408* (2013.01); *H04B 2203/5466* (2013.01); *H04B 2203/5483* (2013.01); *H04B 2203/5491* (2013.01); *H04L 5/0044* (2013.01); *H04L 5/0094* (2013.01); *H04L 25/0272* (2013.01)

(58) Field of Classification Search
USPC ........................................................ 370/478
See application file for complete search history.

(56) References Cited

U.S. PATENT DOCUMENTS

| | | | | |
|---|---|---|---|---|
| 2008/0075109 | A1* | 3/2008 | Zangi | H04W 72/06 370/458 |
| 2009/0067389 | A1* | 3/2009 | Lee | H04W 74/02 370/336 |
| 2009/0161622 | A1* | 6/2009 | Sugaya | H04W 48/12 370/329 |
| 2010/0278062 | A1* | 11/2010 | Abraham | H04W 72/085 370/252 |
| 2010/0284312 | A1* | 11/2010 | Sampath | H04W 74/02 370/276 |
| 2011/0038343 | A1* | 2/2011 | Bhatti | H04W 28/06 370/330 |
| 2011/0090880 | A1* | 4/2011 | Abraham | H04W 12/08 370/338 |

* cited by examiner

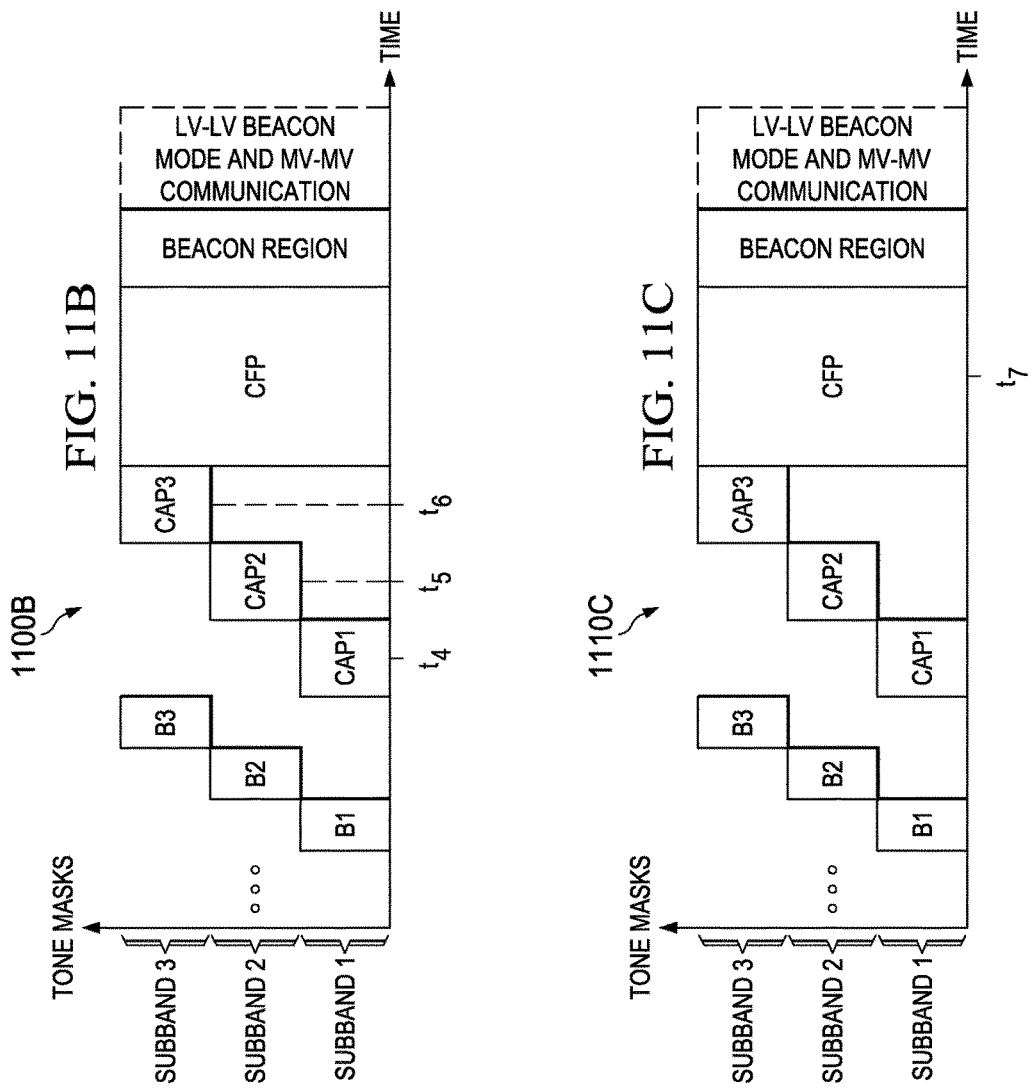

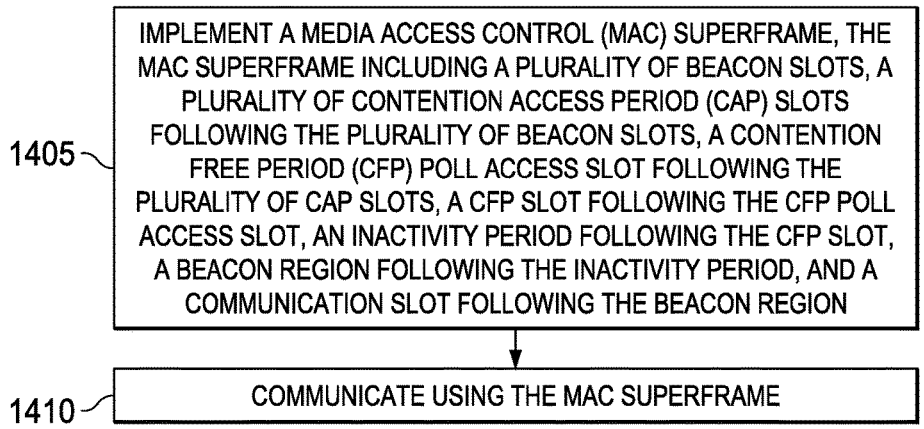
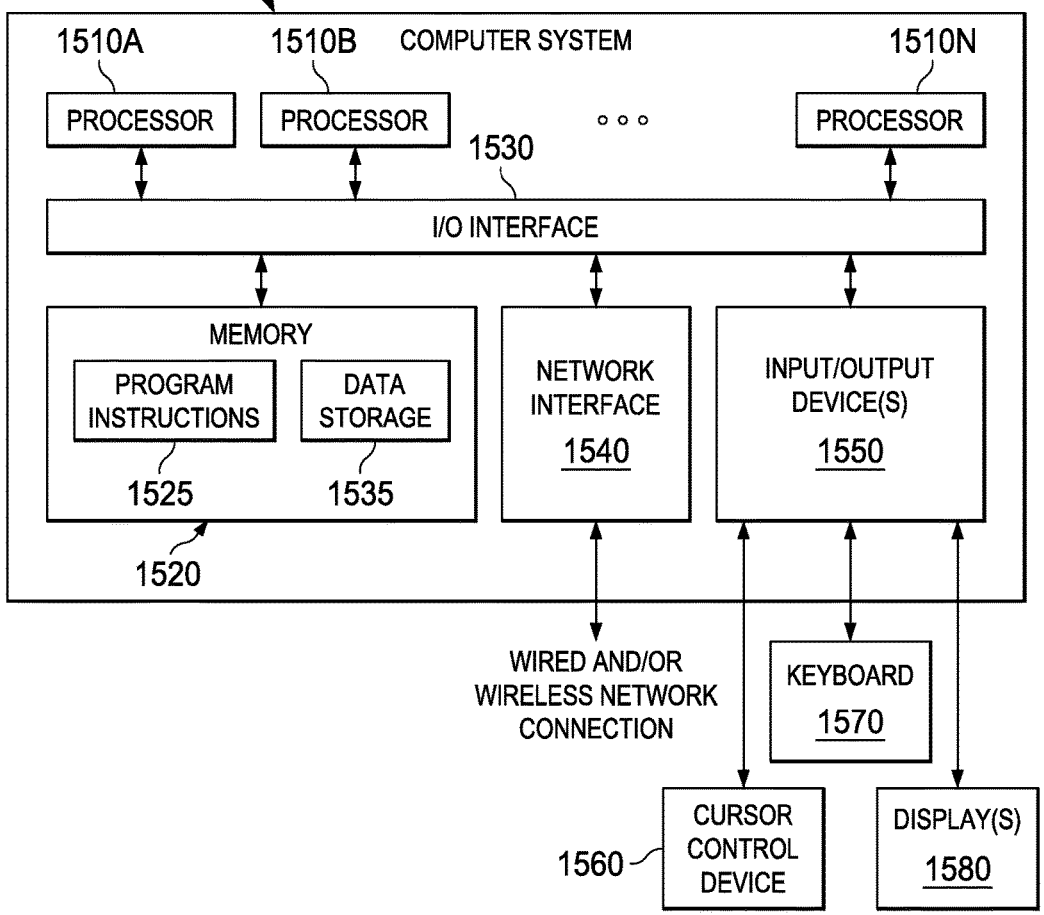

HYBRID COMMUNICATION NETWORKS

CROSS-REFERENCE TO RELATED APPLICATION

This application is a continuation of and claims priority to U.S. patent application Ser. No. 13/457,612, filed Apr. 27, 2012, which claims the benefit of U.S. Provisional Patent Application No. 61/482,298 titled "Hybrid Solution for MV-LV PLC Networks" and filed May 4, 2011. Said applications are herein incorporated by reference in their entirety.

TECHNICAL FIELD

This specification is directed, in general, to network communications, and, more specifically, to systems and methods for designing, using, and/or implementing hybrid communication networks.

BACKGROUND

There are several different types of communication networks available today. For example, Power Line Communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for designing, using, and/or implementing hybrid communication networks are described. In an illustrative, non-limiting embodiment, a method may include performing one or more operations via a first communication device. For example, the method may include sequentially scanning a plurality of frequency subbands for one or more beacons transmitted by a second communication device following a superframe structure, the superframe structure having a plurality of beacon slots, a plurality of Contention Access Period (CAP) slots following the plurality of beacon slots, and a Contention Free Period (CFP) slot following the plurality of CAP slots, each of the plurality of beacon slots and each of the plurality of CAP slots corresponding to a respective one of the plurality of frequency subbands, and the CFP slot corresponding to a combination of the plurality of frequency subbands. The method may also include, in response to having received the one or more beacons, communicating with the second communication device following the superframe structure.

In some implementations, communicating with the second communication device may include, in response to having received the one or more beacons, creating a downlink subband report, transmitting the downlink subband report over each of the plurality of frequency subbands during respective ones of the plurality of CAP slots to the second communication device, and receiving a subband allocation message from the second communication device, the subband allocation message identifying a first of the plurality of frequency subbands as suitable for subsequent downlink communications and identifying a second of the plurality of frequency subbands as suitable for subsequent uplink communications.

Additionally or alternatively, the method may include receiving data from the second communication device over the first of the plurality of frequency subbands during a first CAP slot corresponding to the first frequency subband, and transmitting an acknowledgement message to the second communication device over the second of the plurality of frequency subbands during the first CAP slot. Additionally or alternatively, the method may include transmitting data to the second communication device over the second of the plurality of frequency subbands during a second CAP slot corresponding to the second frequency subband, and receiving an acknowledgement message from the second communication device over the first of the plurality of frequency subbands during the second CAP slot. Additionally or alternatively, the method may include receiving a poll request from the second communication device over the first of the plurality of frequency subbands during the CFP slot and, in response to the poll request, transmitting a data packet to the second communication device over the second of the plurality of frequency subbands during the CFP slot. In response to transmitting the data packet, the method may also include an acknowledgement message from the second communication device over the first of the plurality of frequency subbands.

In some cases, the first communication device may be a first-level, low-voltage (LV) Power Line Communications (PLC) device, and the second communication device may be a medium-voltage (MV) PLC device.

Also, in response to not having received the one or more beacons, the method may include simultaneously scanning the plurality of frequency subbands for one or more other beacons transmitted by a third communication device and, in response to having received the one or more other beacons, communicating with the third communication device during a transmit period indicated by the one or more other beacons. In some implementations, the transmit period may specify a period of time during which the first communication device is allowed to transmit messages to the third communication device. In other words, the receiving PLC device may be allowed to transmit only during that amount of time from the reception of the message.

If the period of time is finite, the first communication device may include a lower-level, LV PLC device, and the third communication device may include a first-level, LV PLC device. If the period of time is set to infinity, the first communication device may include a lower-level, low-voltage (LV) Power Line Communications (PLC) device, and the third communication device may include another lower-level LV PLC device. In other implementations, the transmit period may specify a period of time during which the first communication device is prohibited from transmitting messages to the third communication device.

The method may further include, in response to not having received the one or more other beacons, transmitting a first beacon receiving a second beacon from the third communication device, the second beacon indicating the transmit period. Again, if the transmit period is finite, the first communication device may include a lower-level LV PLC device, and the third communication device may include a first-level LV PLC device. Conversely, if the transmit period is set to infinity, the first communication device may include a lower-level LV PLC device, and the third communication device may include another lower-level LV PLC device.

In some embodiments, one or more communication devices or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a device, router, or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
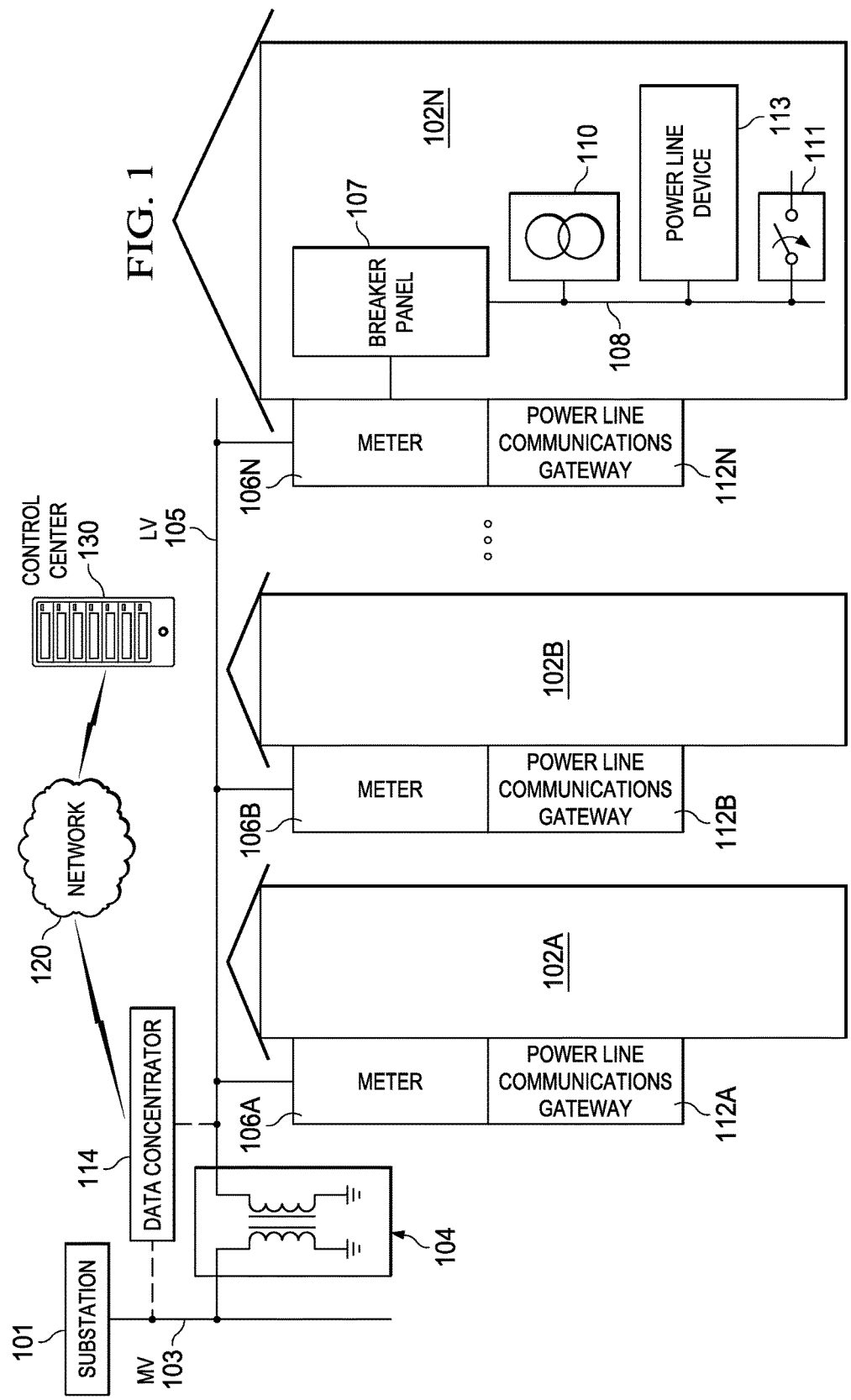

Having thus described the invention(s) in general terms, reference will now be made to the accompanying drawings, wherein:

FIG. 1 is a block diagram of a Power Line Communication (PLC) environment according to some embodiments.

Figure 2:
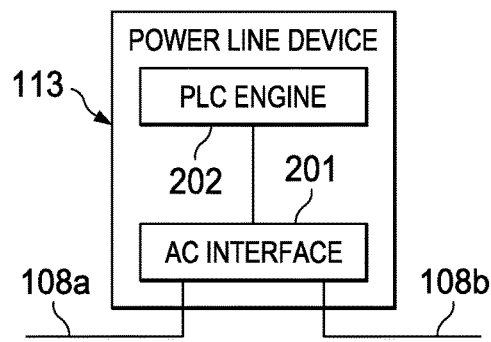

FIG. 2 is a block diagram of a PLC device or modem according to some embodiments.

Figure 3:
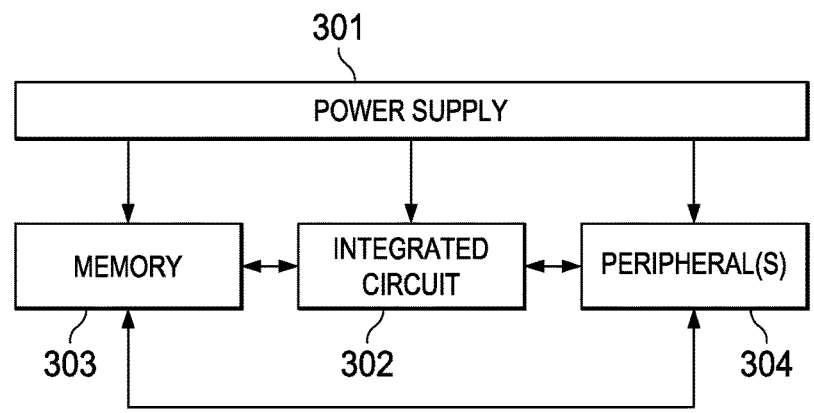

FIG. 3 is a block diagram of an integrated circuit according to some embodiments.

Figure 4:
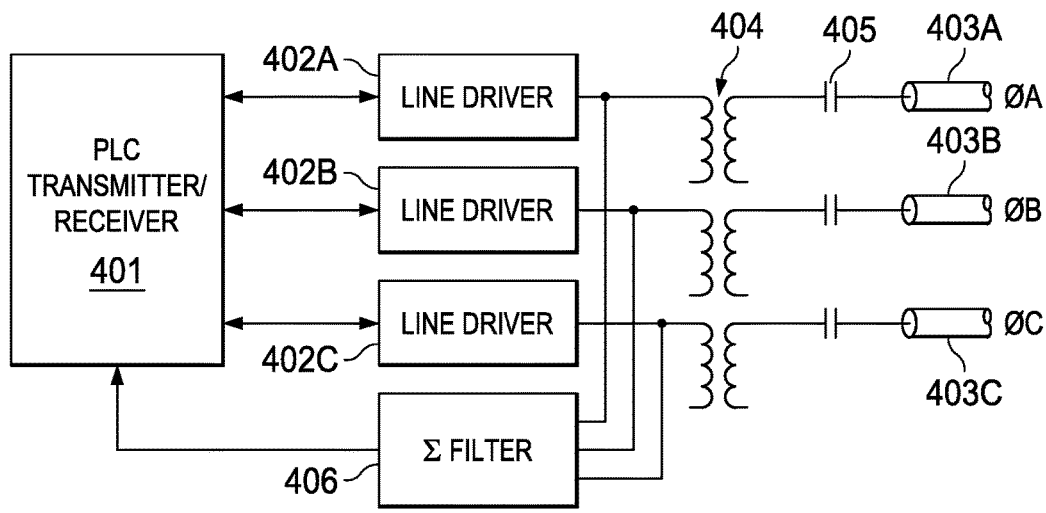
Figure 5:
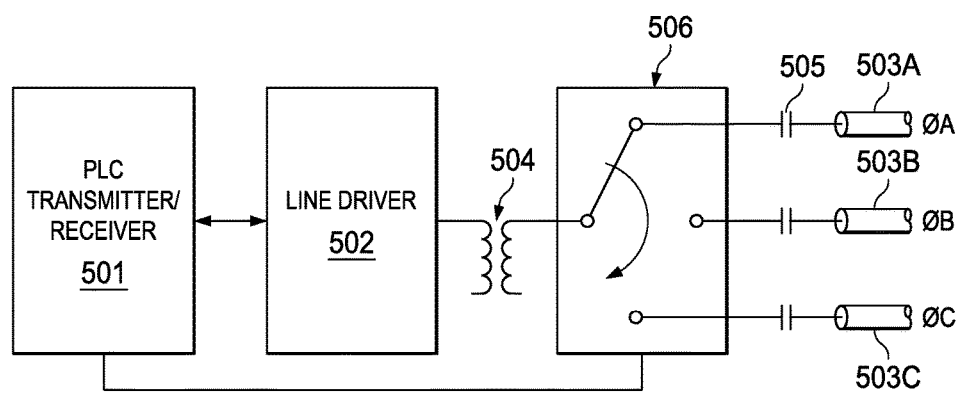
Figure 6:
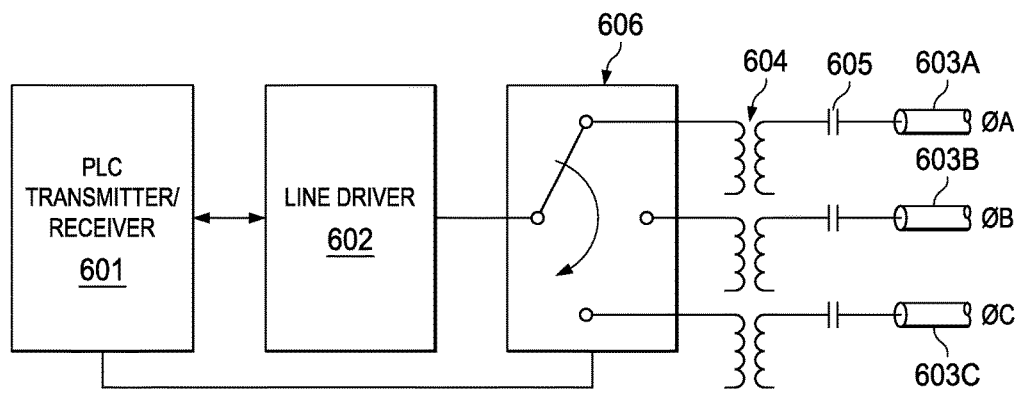

FIGS. 4-6 are block diagrams illustrating connections between a PLC transmitter and/or receiver circuitry to three-phase power lines according to some embodiments.

Figure 7:
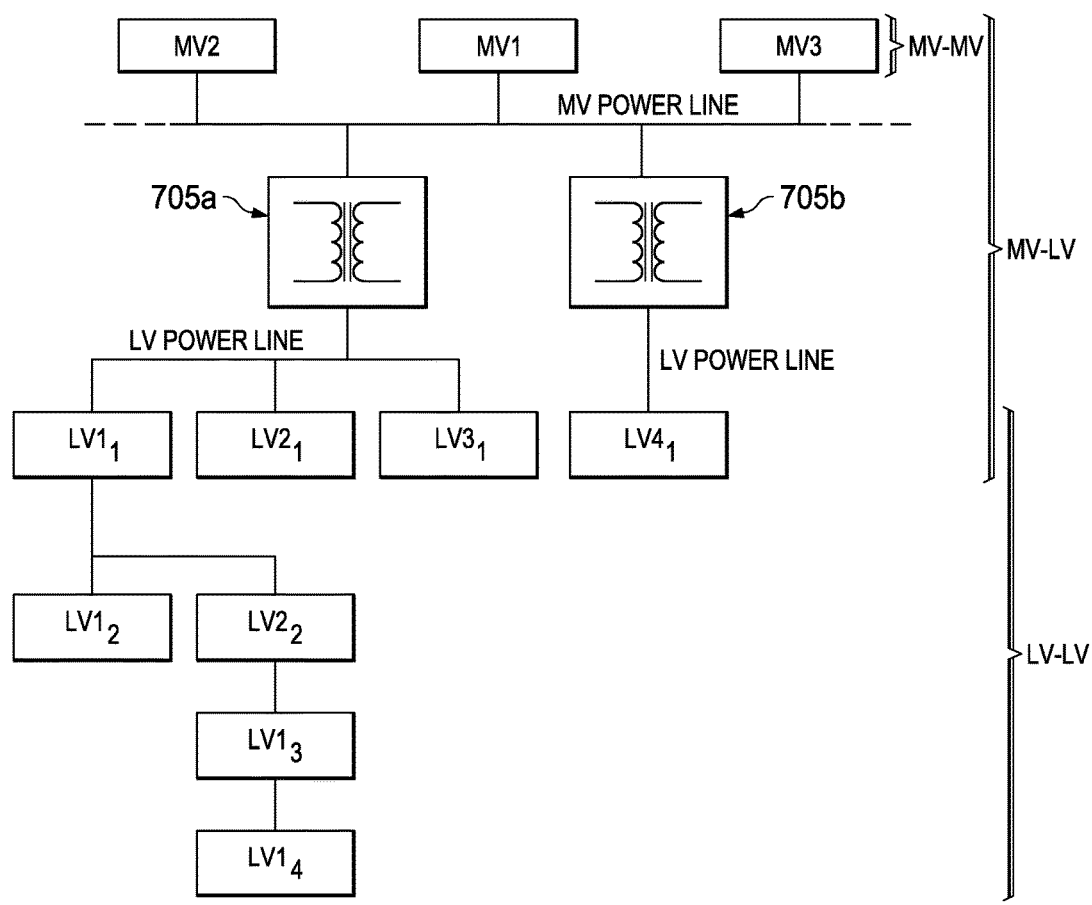

FIG. 7 is a block diagram of a hierarchical PLC communications network according to some embodiments.

Figure 8:
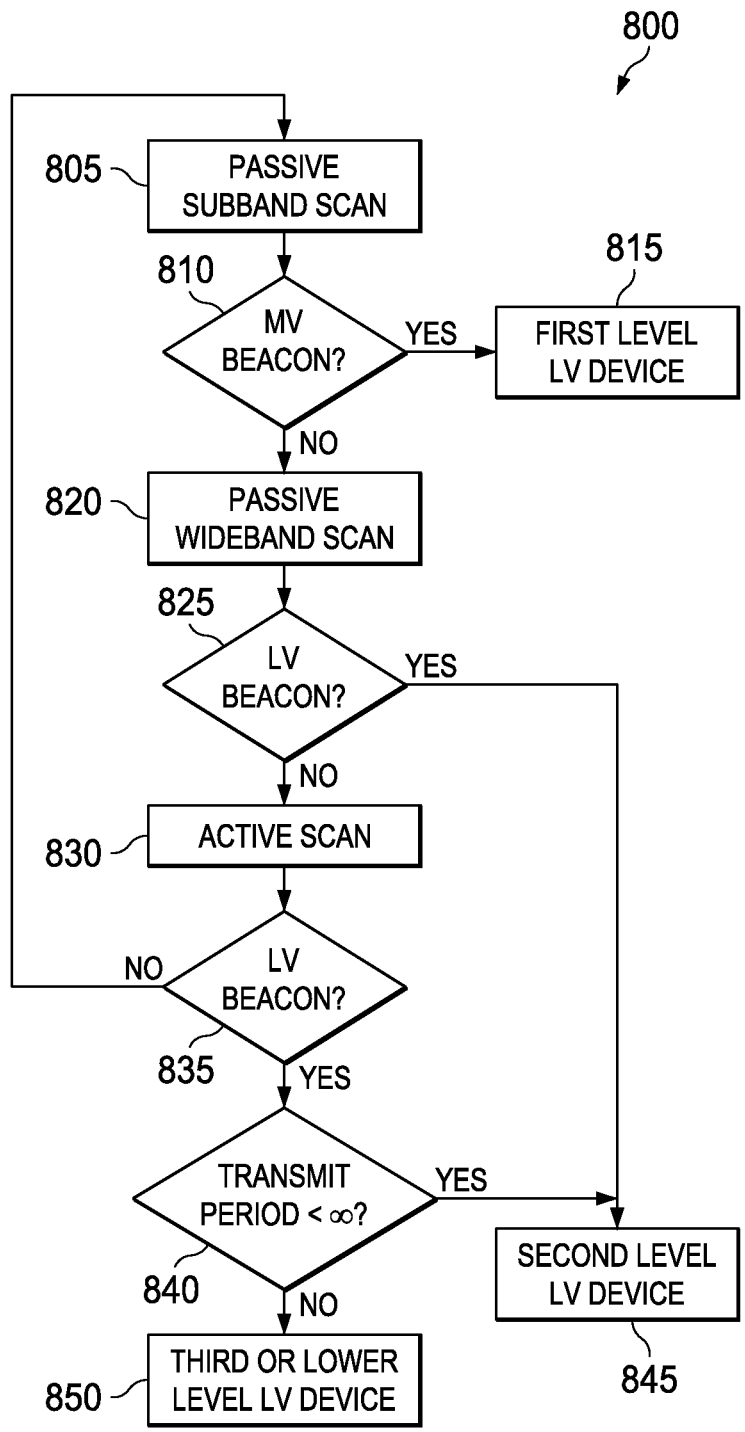

FIG. 8 is a flowchart of a method of low-voltage (LV) PLC device scanning or discovery according to some embodiments.

Figure 9:
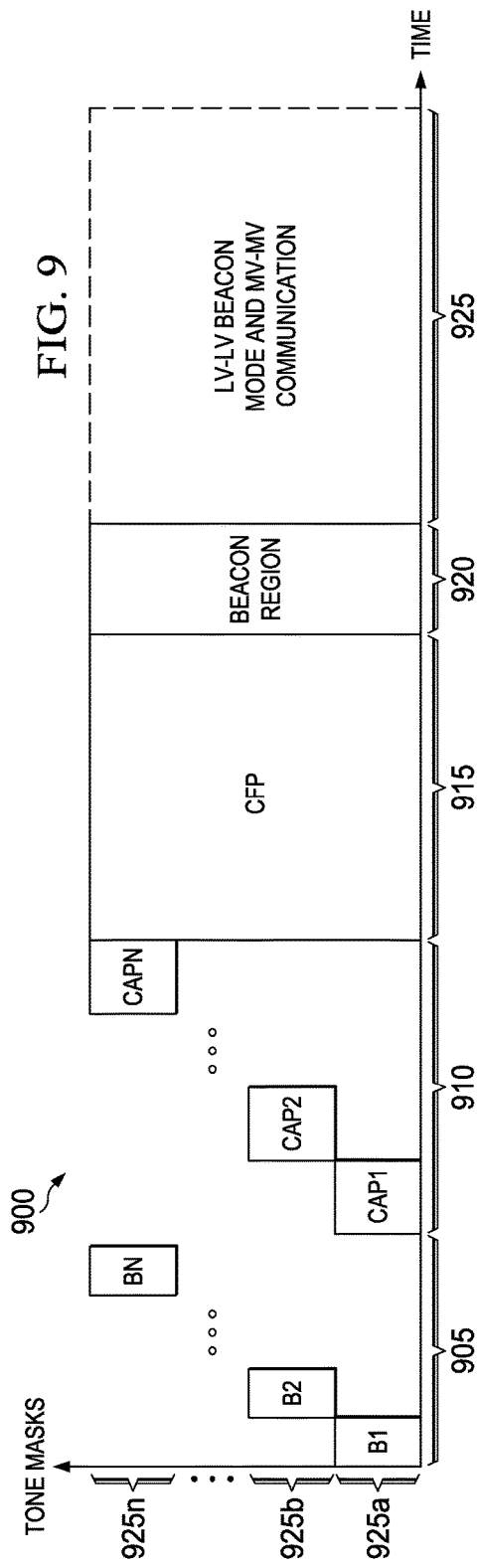

FIG. 9 is a block diagram of a Contention Access Period (CAP)-based Media Access Control (MAC) superframe structure suitable for PLC communications according to some embodiments.

Figure 10A:
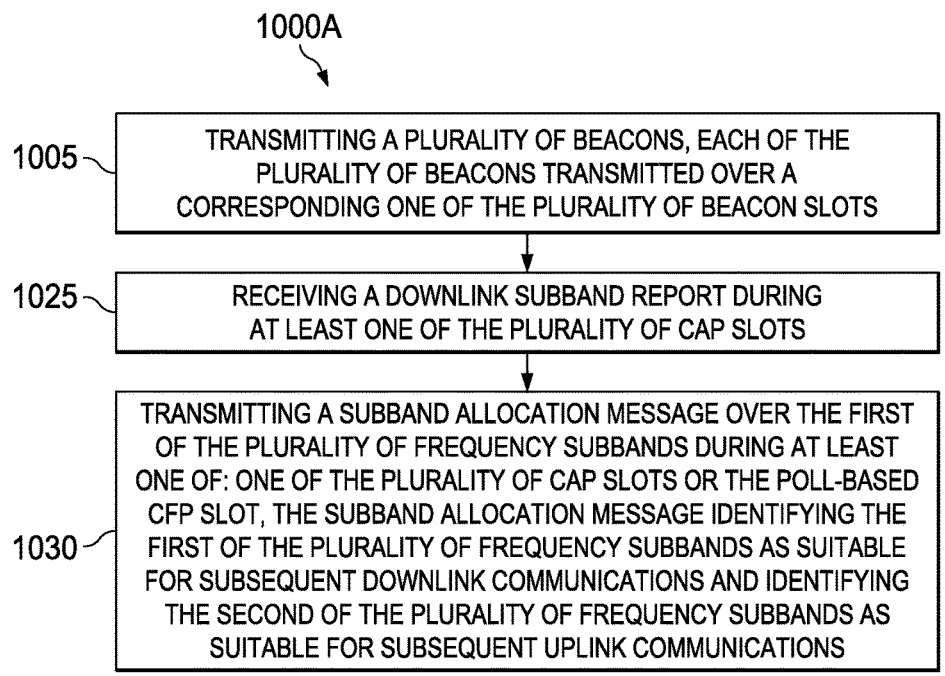
Figure 10B:
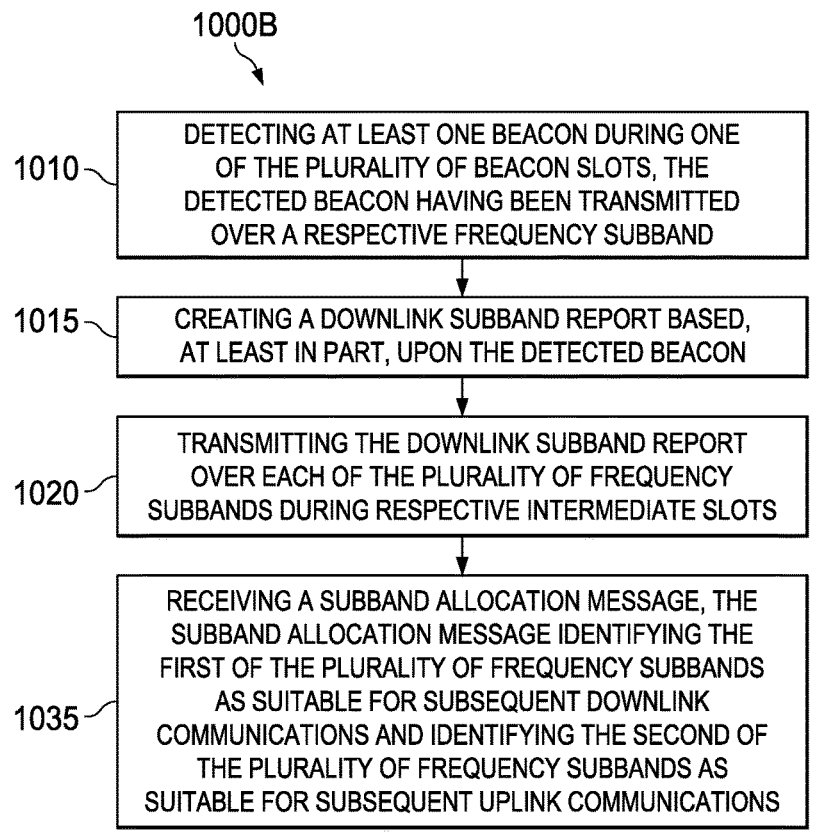

FIGS. 10A and 10B are flowcharts of a discovery method using a CAP-based superframe according to some embodiments.

Figure 11A:
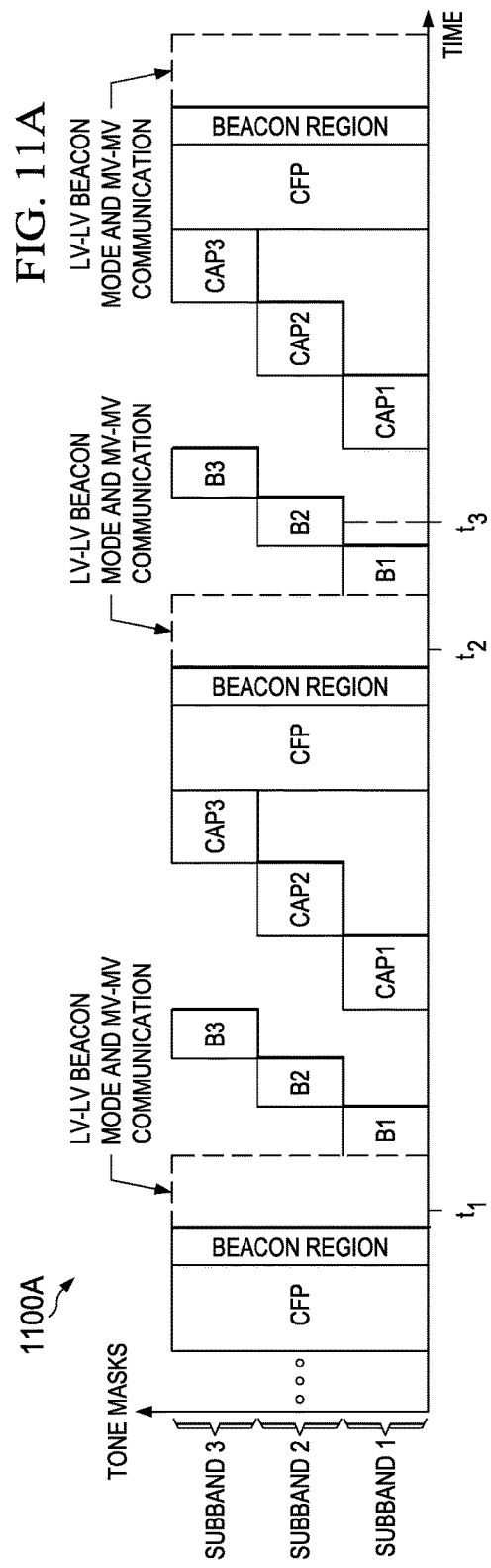

FIGS. 11A-C are diagrams illustrating the discovery method using the CAP-based superframe according to some embodiments.

Figure 12:
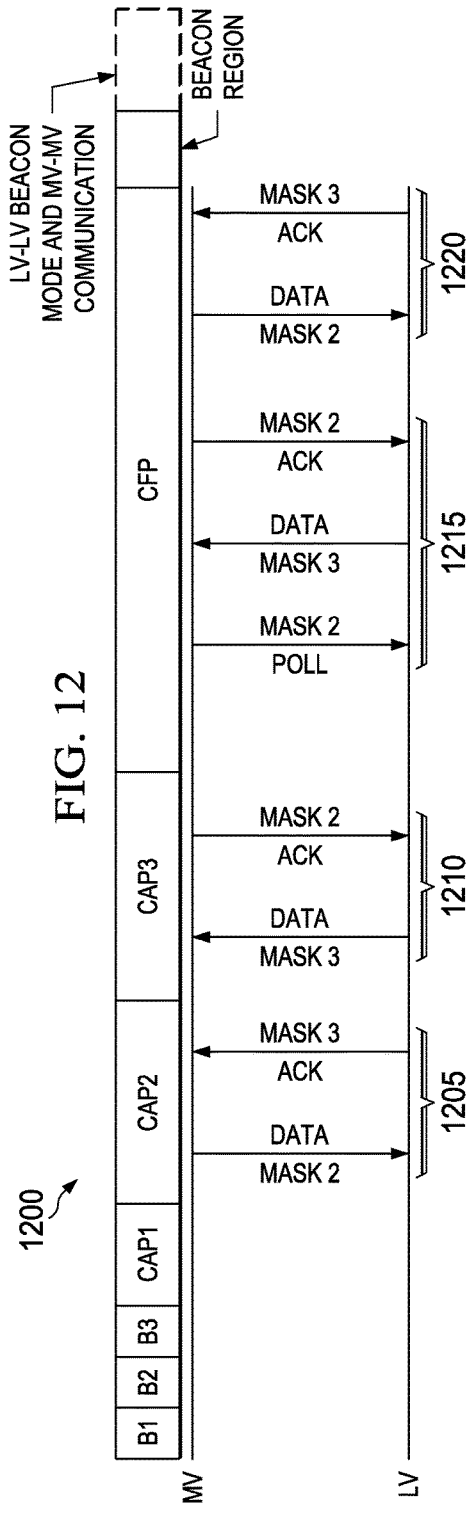

FIG. 12 is a diagram of steady-state communications between an MV device and a first-level LV device according to some embodiments.

Figure 13:
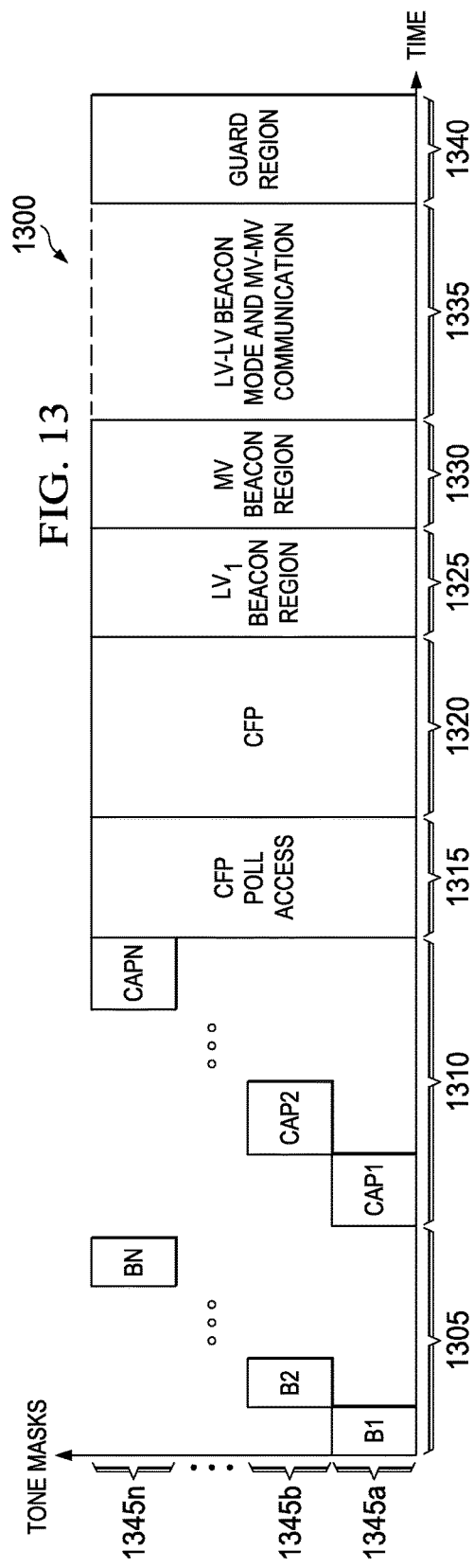

FIG. 13 is a block diagram of a MAC superframe suitable for synchronization according to some embodiments.

FIG. 14 is a flowchart of a method of synchronizing MAC superframe structures across MV devices according to some embodiments.

FIG. 15 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to design and/or implement communications in beacon-enabled networks. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

Turning to FIG. 7 a block diagram of a hierarchical PLC communications network 700 is depicted. In the embodiment shown, medium-voltage (MV) devices or modems MV1, MV2, and MV3 (e.g., PLC data concentrators, routers, etc.) are coupled to an MV power line (e.g., 103 in FIG. 1) and can communicate with each other over the MV power line. First-level low-voltage (LV) devices $LV1_1$, $LV2_1$, $LV3_1$, and $LV4_1$ (e.g., a PLC charger, a PLC meter, a PLC modem, a PLC router, etc.) are coupled to an LV power line (e.g., 105 in FIG. 1) through transformers 705a and 705b (e.g., 104 in FIG. 1), and are within the sensing range of the MV modem(s). Second-level LV devices $LV1_2$ and $LV2_2$ are coupled to the LV power line, are out of the sensing range of the MV modem, but are within the sensing range of first-level devices. Similarly, third-level device $LV1_3$ is coupled to device $LV2_2$, and fourth-level device $LV1_4$ is coupled to device $LV1_3$ (second-, third-, and fourth-level devices may be referred to as "lower-level" devices). It should be noted that network 700 is presented for sake of illustration only, and that in any given implementation may include an arbitrary number of MV and/or LV devices coupled in different ways under a different hierarchy. As illustrated, at least three different types of communication take place in network 700; namely, between MV devices (the "MV-MV network"), between MV devices and first-level LV devices (the "MV-LV network"), and among LV devices (the "LV-LV network").

Within network 700, communications may be achieved between or among devices using one or more different frequency subbands (also referred to as "tone masks" or "channels") in the downlink and uplink directions. Generally speaking, the term "downlink" refers to a communication in a direction that is received by a given device, and the term "uplink" refers to a communication in a direction that is transmitted by that same device. In the case of MV-LV communications, however, the term "downlink" refers to links or communications taking place from an MV device to an LV device, and the term "uplink" refers to links or communications taking place from an LV device to an MV device.

In a typical scenario, the frequency subband over which an MV device can communicate with an LV device (downlink) may be different from the subband that the LV device may used to communicate with an MV device (uplink). Also, the uplink and downlink subbands may be different between different LV devices communicating with the same MV device. As such, each PLC device involved in a communication may select (or allow another device to assign) good or best communication channels or subbands, for example, based upon a determination of channel conditions (e.g., signal-to-noise ratio (SNR) measurements, congestion indicators, etc.) or the like.

In various embodiments, the PLC devices described above (and/or the computer system shown in FIG. 15) may be configured to implement one or more communication techniques through modifications to the network's MAC protocol. Generally speaking, a MAC protocol is a sub-layer of a data link layer specified in a seven-layer Open Systems Interconnection (OSI) model. Particularly, a MAC protocol may provide addressing and channel access control mechanisms that enable terminals or network nodes (e.g., PLC modems, etc.) to communicate over a shared medium (i.e., a power line). To facilitate communications among the devices described above, each device may implement a MAC protocol configured to coordinate communications according to one or more of the techniques illustrated in FIGS. 8-14.

For example, in some implementations, communications among MV1, MV2 and/or MV3, as well as communications between first-level LV devices and second-level LV devices may be performed in beacon mode based on one or more MAC superframe structure(s) using carrier sense multiple access (CSMA) or other carrier access (CA) technique during allocated time(s). Communications between MV devices and first-level LV devices may be performed following the MAC superframe structure(s). Meanwhile, communications between lower-level LV devices may be performed using wideband CSMA/CA operational at all times. These and other operations are discussed below.

In summary, one or more of the techniques disclosed herein may include methods to coordinate medium-to-low voltage (MV-LV) and low-to-low voltage (LV-LV) PLC networks when the MV-LV network operates in a frequency subband mode and the LV-LV network operates in wideband mode (i.e., hybrid communications). In some implementations, MV routers and LV routers may have different profiles. For example, MV-LV communications may be performed using MAC superframe structures, and first-level LV to lower-level LV communications may take place using a beacon mode. Lower layer LV nodes may communicate using non-beacon modes. Also, initial scanning or discovery procedures may encourage first-to-second-level LV device communications rather than MV-to-first-level LV connections.

Discovery and/or Scanning Techniques

In various embodiments, MV devices (e.g., MV1, MV2 and/or MV3) may perform an active scan procedure to search for an MV coordinator or an MV personal area network (PAN) coordinator. Generally speaking, the MV device may transmit a beacon request and receive a beacon from another MV device in response. The received beacon may indicate, for example, whether the other MV device is a coordinator or PAN coordinator. The received beacon may also include other operational information such as, for example, which MAC superframe structure to use, one or more sets of orthogonal frequency subbands that are available for use in subsequent communications, etc.

In contrast with the MV scanning procedure described above, FIG. 8 is a flowchart of a method of LV PLC device scanning or discovery technique. In some embodiments, method 800 may be performed, at least in part, by an LV device upon being introduced into a PLC network, upon being rebooted, under command of a user or administrator, etc. Once method 800 is completed, the new LV device may know, for example, its position in the network hierarchy, as well as which mode of operation or profile to employ in subsequent communications.

At block 805, an LV device may perform a passive, sequential frequency subband or tone mask scan procedure. This procedure is illustrated in connection with FIGS. 10 and 11. At block 810, if a beacon from an MV device ("MV beacon") is received, then the LV device may identify itself as a first-level LV device at block 815. From that point on, the LV device may communicate with MV devices (and/or second-level LV devices) in beacon mode following a MAC superframe structure such as, for example, shown in FIG. 9. Returning to block 810, if the LV device does not receive an MV beacon, it may perform a passive scan in wideband mode (i.e., two or more, or all of the available frequency subbands or tone masks at once) at block 820 in search of a beacon transmitted by an LV coordinator ("LV beacon"). If the LV beacon is received, control passes to block 825.

If block 825 determines that the LV beacon is received, then the LV device may identify itself as a second-level LV device at block 845. Conversely, if the LV beacon is not received at block 825, at block 830 the LV device may perform an active scan procedure. In other words, it may transmit a beacon request, which, if successful as determined at block 835, results in a beacon being received from an LV coordinator. Otherwise control returns to block 805. At block 840, if an LV beacon is received either because of passive wideband scan 820 or active scan 830, method 800 may determine whether the LV beacon includes a "transmit permit period" indication. If the transmit permit period is set to a finite value (thus indicating that the received LV beacon was transmitted by a first-level LV coordinator), then the LV device may identify itself as a second-level LV device at block 845. Otherwise, if the transmit permit period does not exist or has been set to infinity (thus indicating that the received LV beacon was transmitted by a third- or lower-level LV coordinator), the LV device may identify itself as a third- (or lower-) level LV device at block 850.

In some implementations, second-level LV devices may transmit messages only when allowed to do so by an LV coordinator (i.e., a first-level LV device). LV beacons transmitted by first-level LV coordinators may a carry the transmit permit period equal to the remaining time available in the MAC superframe structure employed by its associated MV device. Also, a finite transmit permit period implies that the LV coordinator sends periodic beacons. Thus, the first-level LV coordinator may communicate with a second-level LV device using a beacon mode based on a MAC superframe structure as shown in FIG. 9. All other LV routers, however, may have transmit permit periods in their beacon packets either absent or set to infinity, thus implying that nodes associated with them are able to transmit messages at any time. Again, communications between lower-level LV devices may be performed using wideband CSMA/CA operational at all times.

In alternative implementations, however, second-level LV devices may transmit messages at all times, unless instructed not to do so by an LV coordinator. In those cases, an LV beacon may include a "transmit prevent period" that indicates a period of time equal to the remaining time that is unavailable in the MAC superframe structure employed by its associated MV device. In other words, the transmit prevent period may indicate a time interval during which an LV device is prevented from transmitting messages. Similarly as above, a transmit prevent period greater than zero (and smaller than infinity) implies that the LV coordinator sends periodic beacons; thus, the first-level LV coordinator may communicate with a second-level LV device using a beacon mode based on a MAC superframe structure. Conversely, if the transmit prevent period is equal to zero, it may imply that the LV coordinator is itself a lower-level LV device, and communications between lower-level LV devices may be performed using wideband CSMA/CA operational at all times.

In sum, upon joining a network, an LV device may attempt to detect an MV beacon using a passive, subband scan technique. If the passive subband technique succeeds, the LV device may identify itself as a first-level LV device (i.e., very close to the MV device) in the network hierarchy. Otherwise the LV device may attempt to detect an LV beacon from an LV coordinator using another passive scan technique, but this time in wideband. Additionally or alternatively, the LV device may attempt to receive an LV beacon from the LV coordinator in response to a beacon request in an active scan procedure. If either of the latter two procedures succeeds, the LV device may identify itself as a second- or lower-level LV device in the network hierarchy. Whether the LV device is a second- or lower-level device may depend upon the contents of the LV beacon. If the LV beacon includes a transmit permit period, and the period is set to a finite number, the LV device may identify itself as a second-level LV device. Conversely the transmit permit period is absent or set to infinity (or, in some case, a large number compare to the length of a superframe structure) the device may identify itself as a third- or lower-level LV device. In the alternative, if the LV beacon has a transmit prevent period set to a finite number (greater than zero and smaller than infinity), the LV device may identify itself as a second-level LV device. If the LV beacon has a transmit prevent period set to zero (or absent), the LV device may identify itself as a third- or lower-level LV device.

FIG. 9 is a block diagram of a MAC superframe structure suitable for PLC communications according to some embodiments. As illustrated, superframe 900 includes beacon slots 905 (e.g., $B_1, B_2, \ldots, B_N$), followed by Contention Access Period (CAP) slots 910 (e.g., $CAP_1, CAP_2, \ldots, CAP_N$), which are in turn followed by Contention Free Period (CFP) slot 915, which may be either poll-based on Guaranteed Time Slot (GTS)-based, beacon region 920, and then LV-LV beacon mode and MV-MV communications 925.

In various embodiments, superframe 900 may be particularly well suited for use by the MV devices (e.g., MV1, MV2, or MV3) and may be followed by first-level LV devices (e.g., $LV1_1, LV2_1, LV3_1$, and/or $LV4_1$). In such cases, during beacon slots 905, an MV device may transmit one or more beacon packets (e.g., over slots $B_1, B_2, \ldots, B_N$) to one other MV devices and/or to one or more first-level LV devices $LV1_1, LV2_1, LV3_1$, and/or $LV4_1$ (i.e., in a downlink direction). Moreover, each beacon packet may include information that identifies the particular beacon slot over which it was sent and/or it may indicate the length, position, and/or duration of other elements in superframe 900 (e.g., other beacon slots, CAP slots 910, poll-based CFP 915, etc.). Accordingly, once a listening first-level LV device receives a given beacon packet, for example, the structure and/or timing of superframe 900 may be readily acquired or derived by that device.

During CAP slots 910, superframe 900 may allow one or more of first-level LV devices $LV1_1, LV2_1, LV3_1$, and/or $LV4_1$ to transmit packets to an MV device (i.e., in the uplink direction), subject to contention or competition for the medium (e.g., using a CSMA/CA technique or the like). During CFP 920, however, MV1 may employ a poll-based or GTS mechanism for uplink and/or downlink communications with first-level PLC devices $LV1_1, LV2_1, LV3_1$, and/or $LV4_1$ without contention and/or risk of collision. Beacon region 920 may be used for transmitting beacons by an LV node immediately connected to the MV device, connected to an LV border router, and/or to other MV devices (i.e., a first-level LV device). In some embodiments, it is during beacon region 920 that a first-level LV device may transmit LV beacons (or respond to beacon requests) to lower-level LV devices in wideband. Meanwhile, region 925 may allow LV-LV beacons to be transmitted and/or received, as well as general MV-MV communications.

As illustrated, beacon slots 905 and CAP slots 910 in superframe 900 may be divided into tone masks or frequency subbands 925a-n. Specifically, $B_1$ and $CAP_1$ occupy frequency subband 925a, $B_2$ and $CAP_2$ occupy frequency subband 925b, and $B_N$ and $CAP_N$ occupy frequency subband $925_N$. Hence, in this case, each of beacon slots 905 and CAP slots 910 follow a same sequence of frequency subbands. In other cases, however, beacon slots 905 and CAP slots 910 may follow different sequences of frequency subbands. Moreover, CFP slot 915, beacon region 920, and LV-LV beacon mode and MV-MV communications 925 span all subbands 925a-n at the same time. It should be noted that any given implementation may include any arbitrary number of two or more frequency subbands. Also, in some implementations, each of tone masks 925a-n may have an equal, predetermined spectral width. Additionally or alternatively, tone masks 925a-n may have different spectral widths. Similarly, each of CAP slots 910 may have an equal, predetermined duration or length. Additionally or alternatively, CAP slots 910 may have varying durations or lengths.

In this manner, first-level LV devices $LV1_1, LV2_1, LV3_1$, and/or $LV4_1$ intending to contend in a given channel may choose or otherwise be assigned one of CAP slots 910 in which to transmit a packet to MV1, MV2, and/or MV4. Collision may still happen, for example, if two different nodes select or is assigned the same one of CAP slots 910. However, if only one node chooses or is assigned a particular one of CAP slots 910, then it may have its transmission free from collisions during the entire transmission time. These techniques may therefore be particularly useful to avoid or otherwise reduce "hidden node" problems, where one of first-level LV devices $LV1_1, LV2_1$, or $LV3_1$ cannot sense (e.g., via CSMA/CA or the like) an ongoing transmission by another first-level LV device $LV4_1$ because such a transmission is attenuated in the LV power line due to transformers 705a-b. If a first-level LV device (e.g., LV1) cannot sense $LV4_1$'s ongoing transmission and thus decides to initiate their own transmission, the two concurrent transmissions from the different sources $LV1_1$ and $LV4_1$ may collide in MV power line, and MV devices would not be able to receive either communication.

As noted above, any given one of MV devices MV1, MV2, or MV3 of FIG. 7 may employ a superframe such as superframe 900. In some embodiments, techniques may be provided to allow one of first-level LV devices $LV1_1, LV2_1, LV3_1$, and/or $LV4_1$ to be "discovered" by the MV device, for example, when such an LV device is added to an existing network and/or when the entire network is initialized (e.g., block 805 of FIG. 8). In that regard, FIGS. 10A and 10B are flowcharts of a discovery method using a CAP-based superframe. In some implementations, method 1000A may be performed by one of MV devices MV1, MV2, or MV3, whereas method 1000B may be performed by a first-level LV device $LV1_1, LV2_1, LV3_1$, or $LV4_1$. To help explain these methods, FIGS. 11A-C are also provided. Particularly, diagrams 1100A-C illustrate methods 1000A and 1000B using CAP-based superframe in an example environment employing three frequency subbands ("subband 1," "subband 2," and "subband 3").

At block 1005, an MV device may transmit a plurality of beacons, each of the beacons transmitted over a corresponding one of a plurality of beacon slots. At block 1010, an LV device may detect at least one of the transmitted beacon during a given one of the plurality of beacon slots over a respective frequency subband. In the example of FIG. 11A, the LV device starts listening for MV devices at time $t_1$. To that end, the LV device may passively listen for beacons in the first subband (subband 1). It is assumed, for sake of illustration, that the first and third frequency subbands (subbands 1 and 3) have poor channel conditions (e.g., SNR, interference, etc.) and therefore only $B_2$ arrives at the receiver of the LV device over subband 2. Because the LV device's receiver is tuned to subband 1, however, the LV device does not detect any beacons transmitted by the MV device. At time $t_2$, however, the LV device may tune its receiver to subband 2. Thus, at time $t_3$, the LV device may finally detect $B_2$. Also, once $B_2$ is received, the LV device may have knowledge of all subsequent superframe slots (e.g., when/where each beacon slot begins and ends, when/where each CAP slots begins and ends, etc.). Therefore, at block 1015, the LV device may create a downlink subband report for each of subbands 1-3. Such a report may include, for example, a link quality indicator or the like (e.g., SNR, etc.), which may be calculated or estimated based upon the received (and/or not received) beacons.

At block 1020, the LV device may transmit the downlink subband report to the MV device over each of subbands 1-3 during each respective CAP slot. At block 1025, the MV device may receive the report during the CAP slots. Diagram 1100B shows the report being transmitted by the LV device to the MV device during three distinct times $t_4$, $t_5$, and $t_6$ over subband 1, subband 2, and subband 3 during $CAP_1$, $CAP_2$, and $CAP_3$, respectively. Here it is assumed that, due to channel conditions in the uplink direction, only the report transmitted during $CAP_3$ is actually received by the MV device at block 1025. As such, the MV device may allocate subband 2 for downlink communications and subband 3 for uplink communications with the LV device. In other situations, however, the MV device may receive the downlink subband report in more than one CAP slot, and may used the received downlink subband report(s) to determine a good or better uplink channel.

It should be noted that, unlike illustrated in FIGS. 11A-C, in other embodiments subbands 1-3 may be different in the uplink and downlink directions, and therefore subject to different channel conditions. Also, in some cases, although physical channel conditions may otherwise be favorable, other LV devices may already be assigned a particular channel. Therefore, the MV device may select a sub-optimal subband (from the perspective of SNR, for example) for a given LV device, for instance, to reduce the possibility of collisions with other devices. Furthermore, in some cases, the LV device may select the downlink subband and communicate its selection to the MV device (instead of or in addition to a downlink subband report).

At block 1030, the MV device may transmit a subband allocation message over the selected downlink subband. At block 1035, the LV device may receive the subband allocation message. Such a message may be transmitted, for example, during the CFP slot at time $t_7$, as shown in diagram 1100C, and/or during one or more of the plurality of CAP slots. The message may identify both downlink and uplink subbands for subsequent communications (e.g., in this example, the downlink subband may be subband 2, and the uplink subband may be subband 3). In some cases, $t_3$-$t_7$ may take place during the same superframe. In other cases, $t_3$-$t_7$ may take place over two or more superframes.

After the discovery or setup period, the LV device knows which mask to use for receiving beacon and data in the downlink direction (the MV devices knows which mask to use for transmissions). The LV device also knows which mask to use for transmitting data in the uplink direction (the MV device known which mask to use for receptions). The LV device also knows the MV device's superframe structure, CAP locations and CFP duration (poll-based or GTS-based). As such, the MV and LV devices may communicate using the assigned or selected frequency subbands in their respective directions.

Steady-State Communications

FIG. 12 is a diagram of steady-state communications between an MV device and a first-level LV device according to some embodiments. During downlink data communication 1205 over $CAP_2$ of superframe 1200, an MV device transmits data to a first-level LV device over the assigned downlink subband (subband 2) and switches its receiver to subband 3. It should be noted that the MV device would ordinarily operate its receiver in subband 2 during $CAP_2$, and that the switching to subband 3 is made to accommodate a quicker or "immediate" acknowledgement from the first-level LV device over its assigned subband (i.e., subband 3). As such, in some cases the MV device's receiver may operate in subband 3 during $CAP_2$ only for the duration of an acknowledgement timeout.

At least during $CAP_2$, the first-level LV device has its receiver tuned to the downlink subband (subband 2), and therefore receives the data. In response to having received the data, the first-level LV device switches its transmitter to the assigned uplink subband (subband 3) and transmits an acknowledgement message or packet to the MV device, still during $CAP_2$. Again, a first-level LV device would generally operate its transmitter in the uplink subband corresponding to the particular CAP slot. However, any acknowledgement would then only be able to be sent during the CAP slot associated with the first-level LV device (in this case, over subband 3 during $CAP_3$). Therefore, in order to provide a "quicker" or "instant" acknowledgement, the first-level LV device may operate outside of the frequency subband associated with a current CAP slot (in this example, the first-level LV device's transmitter uses subband 3 during $CAP_2$). As long as the acknowledgement is received prior to the expiration of the acknowledgement timeout, the MV device receives it. If the acknowledgment is not received prior to the timeout, the MV device may return its receiver to subband 2 (i.e., the subband ordinarily associated with $CAP_2$) and may attempt to send the same data again (e.g., in the same or a subsequent superframe).

During data uplink communication 1210 over $CAP_3$, the first-level LV device wins any contention for the medium (e.g., it may be first among other LV devices in the same network to attempt a transmission and/or perform a successful CSMA/CA operation) and transmits data to the MV device over the assigned uplink subband (subband 3), which corresponds to the current CAP slot ($CAP_3$). In response, the first-level LV device receives an acknowledgement from the MV device over the assigned downlink subband (subband 2).

Data uplink communication 1215 takes place during a CFP slot, in this case, a poll-based CFP slot. As illustrated, the MV device sends a poll message over the assigned downlink subband (subband 2). The first-level LV device switches to the assigned uplink subband (subband 3) to transmit data, and the MV device response with an acknowledgement over the downlink subband (subband 2). Data downlink communication 1220 also takes place during the poll-based CFP slot. Here, the MV device transmits data to the first-level LV device over the assigned downlink subband (subband 2; no poll necessary) and receives the acknowledgement over the assigned uplink subband (subband 3).

In other words, during poll-based CFP, a polling message is transmitted on the downlink subbands of a first-level LV device and the data is transmitted by the first-level LV device on the uplink subband. The MV device switches its receiver to the uplink subbands of the corresponding first-level LV node after transmitting a poll. If a transmission is not sensed within a certain timeout (e.g., a polling timeout), the MV device may then initiate the poll for the next LV device in the network.

Accordingly, using the CAP-based systems and methods described above, data transfers between MV and first-level LV devices may be performed both during CAP and CFP slots. During CAP slots, first-level LV devices may use a CSMA technique (e.g., slotted CSMA) over a corresponding tone mask to compete for access to the medium. First-level LV devices may optionally transfer data to the MV modem during appropriate CAP uplink subband, although they may suffer from hidden node problem from a neighboring LV device operating on the same subband. Conversely, the MV device may transfer data to the first-level LV device during the appropriate CAP downlink subband (for the LV device). Here, there is no hidden node issue since the MV-LV transmission is heard by all LV devices in the network.

In contrast with CAP communications, poll-based CFP or CTS communications may avoid hidden node problem because polling is performed for each LV device. In the case of poll-based CFP, for uplink transmissions, the MV device may poll each first-level LV device for data during the poll-based CFP slot. The poll may be transmitted on the downlink sub-band of a first-level LV device and the corresponding data may be transmitted by the first-level LV device on the uplink sub-band. The MV device may switch its receiver to the uplink subband assigned to the corresponding first-level LV device after transmitting the poll. The first-level LV device may use the poll to prepare and transmit the packet. In some cases, if there are multiple packets to be transmitted, a "more" bit (e.g., set to "1") or other suitable indication may be used in the packet header, for example, to indicate outstanding packets. Also, the MV device may limit the number of packets (or duration) that can be received for a poll request. If a transmission is not sensed within a certain timeout ("Poll Timer"), the MV device may initiate the poll for the next LV node. For downlink transmissions, the MV device may send downlink data at any time during the poll-based CFP slot to the first-level LV devices at the appropriate downlink subbands (as long as the Poll Timer is not set). Also, an acknowledgement for a packet may be sent in the corresponding mask for the opposite direction.

In some embodiments, communications between first-level LV devices and second-level LV devices may be performed as follows. Once the CFP period for a superframe expires, both the MV device and its associated first-level LV device may transmit a beacon using CSMA/CA with high-priority indicating to other nodes that they may transmit using CSMA/CA for a specific, finite period of time (i.e., a "transmit permit period"). Nodes receiving this frame may transmit frames only during the time allocated.

Also, each MV device may implement a different MAC superframe such as shown in FIG. 9. For example, a given MV device may use different time durations and/or or frequency subbands for the various elements of its superframe (techniques useful for synchronizing superframe communications are described below). As such, MV-MV communications may be performed as follows. First, an MV node may wait until it receives a beacon in wideband. This implies that the MV node has completed operating in multiple tone mask mode. Then, the MV device may transmit frames to other MV nodes. In some cases, this procedure may avoid an MV node transmitting a frame after is CFP is completed to another MV node that is still operating under multiple tone mask mode.

For sake of illustration, consider again the network hierarchy shown in FIG. 7. Assume the MAC superframe structure of FIG. 9 having a 12 second duration with its CFP slot 915 ending at t=6 seconds and a period of 2 seconds for beacon region 920; thus t=8-12 is allocated for CSMA/CA in full or wideband operation. In this case, all first-level LV devices ($LV1_1$, $LV2_1$, $LV3_1$, and $LV4_1$) may transmit messages to lower-level devices only during t=8-12. Similarly, all second-level LV devices may transmit only during t=8-12; however, they may receive messages from lower-level devices at any time. Meanwhile, third- and lower-level devices may transmit and/or receive at any time, operating in non-beacon mode during steady-state communications.

As noted above, in some embodiments, first-level LV coordinators and MV coordinators may include "transmit permit periods" in their beacons. A transmit permit period typically indicates the amount of time that a given node has left to communicate with the first-level and/or MV devices. That is, a second-level LV device may only transmit after having received an LV beacon. In other embodiments, however, first-level LV coordinators and MV coordinators may indicate the time that listening nodes are prevented or prohibited from transmitting (i.e., including MV beacons, CAP slots, and CFP period) in the form of a "transmit prevent period." In this case, a second-level LV node may transmit at all times except upon receipt of an LV beacon. As such, second-level LV nodes may utilize the channel better insofar as they are not affected by the temporary loss of LV beacons. On the other hand, however, if an LV beacon is lost the second-level LV device may transmit by default, and their transmissions may collide with MV beacons, CAP slots transmissions, and/or CFP slot transmissions.

In yet other embodiments, LV and MV beacons may indicate whether the network (or a portion thereof) is operating in "transmit permit" mode or "transmit prevent" mode, and LV or MV coordinators may select between the two modes, for example, depending amount an amount of congestion or collisions detected in the network. If the channel quality, congestion, or collision meets a threshold level, the network may switch from "transmit prevent" mode (i.e., more transmissions) to "transmit permit" mode (i.e., less transmissions) and vice-versa.

Additionally or alternatively, first-level LV devices or coordinators may be required to request a slot to transmit beacons to their MV coordinators. The MV coordinator then allocates dedicated beacon slots to each of the associated first-level LV devices or coordinators. As such, beacon region 920 of superframe 900 in FIG. 9 may be effectively split into beacon slots with each slot allocated to a particular first-level LV device or coordinator.

Superframe Synchronization

FIG. 13 is a block diagram of a MAC superframe suitable for synchronization according to some embodiments. As illustrated, superframe 1300 includes beacon slots 1305 (e.g., $B_1$, $B_2$, ..., $B_N$), followed by Contention Access Period (CAP) slots 1310 (e.g., $CAP_1$, $CAP_2$, ..., $CAP_N$), which are in turn followed by Contention Free Period (CFP) poll access slot 1315, CFP slot 1320, $LV_1$ beacon region 1325, MV beacon region 1330, LV-LV beacon mode and MV-MV communication slot 1335, and guard region 1340.

Similarly as in FIG. 9, superframe 1300 may be particularly well suited for use by MV devices (e.g., MV1, MV2, or MV3) shown in FIG. 7. In such cases, beacon slots 1305 and CAP slots 1310 are counterparts to elements 905 and 910 in superframe 900. Here, however, during CFP poll access slot 1315, two or more MV devices (e.g., MV1 and MV2) may compete for access to use the immediately following CFP slot 1320. For example, during CFP poll access slot 1315, any given MV device may employ CSMA/CA in full band (i.e., a combination of frequency subbands 1345a-n) to broadcast a "Poll Reserve Packet" to other MV devices. In some cases, if any MV device gets access to the channel and manages to transmit its Poll Reserve Packet, then that MV device is granted use CFP slot 1320. Conversely, if an MV device receives a Poll Reserve Packet from one or more other MV devices (e.g., before it has a change to transmit its own Poll Reserve Packet), then the MV device remains silent during CFP slot 1320. During CFP 1320, an MV device (e.g., the MV device that gains access to CFP slot 1320 for its own use) may employ a poll-based mechanism for uplink and/or downlink communications (e.g., on-demand) with first-level PLC devices $LV1_1$, $LV2_1$, $LV3_1$, and/or $LV4_1$ without contention and/or risk of collision.

During $LV_1$ beacon region 1325, first-level LV devices $LV1_1$, $LV2_1$, $LV3_1$, and/or $LV4_1$ may employ a CSMA/CA technique to transmit their own beacons to lower-level devices. For example, those beacons may indicate that the lower-level devices are allowed to communicate with each other and/or with the first-level LV device during LV-LV beacon mode and MV-MV communication slot 1335. During $LV_1$ beacon region 1325, MV devices may remain silent or otherwise abstain from transmitting messages (i.e., they may be said to be "inactive"). Similarly, during MV beacon region 1330, each MV device may employ CSMA/CA to transmit beacons to other MV devices indicating that those MV devices are allowed to communicate with each other during LV-LV beacon mode and MV-MV communication slot 1335. During MV beacon region 1330, first-level LV devices may remain silent or otherwise abstain from transmitting messages (i.e., they may be said to be "inactive"). Finally, during LV-LV beacon mode and MV-MV communication slot 1335, MV devices may be allowed to communicate with other MV devices, and LV devices may be allowed to communicate with other LV devices, but there may be no MV-LV communications. Guard region 1340 may then be used to separate subsequent superframes in time.

FIG. 14 is a flowchart of a method of synchronizing MAC superframe structures across MV devices. In some embodiments, method 1400 may be executed, at least in part, by an MV device (e.g., MV1, MV2, and/or MV3 in FIG. 7). At block 1405, method 1400 may include implementing superframe 1300, the MAC superframe including a plurality of beacon slots 1305, a plurality of CAP slots 1310 following the plurality of beacon slots 1305, a CFP poll access slot 1315 following the plurality of CAP slots 1310, a CFP slot 1320 following the CFP poll access slot 1315, an inactivity period (e.g., $LV_1$ beacon region 1325) following the CFP slot 1320, a beacon region (e.g., MV beacon region 1330) following the inactivity period, and a communication slot (e.g., LV-LV beacon mode and MV-MV communication slot 1335) following the beacon region. At block 1410, method 1400 may include communicating with another communication device (e.g., another MV device, and LV device, etc.) using superframe 1300.

It may be determined from the description of FIGS. 13 and 14, that when two or more MV devices use a similar superframe structure, "hidden node" collisions may occur at those MV devices due to transmissions from other MV devices and/or LV devices over the same tone mask. For example, first-level LV devices $LV1_1$, $LV2_1$, $LV3_1$, and/or $LV4_1$ intending to contend in a given channel may choose one of CAP slots 1310 in which to transmit a packet to MV1, MV2, and/or MV4. Collision may happen, for example, if two different nodes select the same one of CAP slots 1310. Specifically, one of first-level LV devices $LV1_1$, $LV2_1$, or $LV3_1$ may not be able to sense (e.g., via CSMA/CA or the like) an ongoing transmission by another first-level LV device $LV4_1$ because such a transmission is attenuated in the LV power line due to transformers 705a-b. If a first-level LV device (e.g., $LV1_1$) cannot sense $LV4_1$'s ongoing transmission and thus decides to initiate their own transmission, the two concurrent transmissions from the different sources $LV1_1$ and $LV4_1$ may collide in MV power line, and MV devices would not be able to receive either communication.

In some embodiments, in order to minimize or otherwise reduce hidden node collisions, the sequence of frequency subbands followed by beacon slots 1305 and CAP slots 1310 may be randomly selected by each MV device and without coordination among those devices. By using such randomized tone mask patterns, each MV device is likely to operate in different tone masks at any given time (although it is not guaranteed that every different MV device will operate in a different tone mask at all times).

Additionally or alternatively, in order to minimize or otherwise reduce hidden node collisions, superframes across different MV devices may be synchronized by allowing a selected one of the MV device to act as a Personal Area Network (PAN) coordinator and determine the superframe structures of other MV devices. For example, the start of beacon period 1305, the start of CFP poll access slot 1315, and the end of CFP slot 1320 may be synchronized across multiple MV devices under control of the PAN coordinator. In some embodiments, only the start and end of an entire CAP period 1310 may be synchronized between multiple MV devices (and each MV device may allocate CAP time for individual frequency subbands independently). Alternatively, the start and end of each time slot within CAP slots 1310 may be synchronized across multiple MV nodes (i.e., the PAN coordinator may specify the CAP start and end times for each CAP slot).

As previously noted, in certain embodiments, systems and methods for designing, using, and/or implementing communications in beacon-enabled networks may be executed, at least in part, by one or more communication devices and/or computer systems. One such computer system is illustrated in FIG. 15. In various embodiments, system 1500 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1500 includes one or more processors 1510 coupled to a system memory 1520 via an input/output (I/O) interface 1530. Computer system 1500 further includes a network interface 1540 coupled to I/O interface 1530, and one or more input/output devices 1525, such as cursor control device 1560, keyboard 1570, display(s) 1580, and/or mobile device 1590. In various embodiments, computer system 1500 may be a single-processor system including one processor 1510, or a multi-processor system including two or more processors 1510 (e.g., two, four, eight, or another suitable number). Processors 1510 may be any processor capable of executing program instructions. For example, in various embodiments, processors 1510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1510 may commonly, but not necessarily, implement the same ISA. Also, in some embodiments, at least one processor 1510 may be a graphics processing unit (GPU) or other dedicated graphics-rendering device.

System memory 1520 may be configured to store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1520 as program instructions 1525 and data storage 1535, respectively. In other embodiments, program instructions and/or data may be received, sent or stored upon different types of computer-accessible media or on similar media separate from system memory 1520 or computer system 1500. Generally speaking, a computer-accessible medium may include any tangible storage media or memory media such as magnetic or optical media—e.g., disk or CD/DVD-ROM coupled to computer system 1500 via I/O interface 1530. Program instructions and data stored on a tangible computer-accessible medium and/or in non-transitory form may further be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, mobile devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, configured to implement certain embodiments described herein, and data storage 1535, comprising various data accessible by program instructions 1525. In an embodiment, program instructions 1525 may include software elements of embodiments illustrated in the above figures. For example, program instructions 1525 may be implemented in various embodiments using any desired programming language, scripting language, or combination of programming languages and/or scripting languages (e.g., C, C++, C#, JAVA®, JAVASCRIPT®, PERL®, etc.). Data storage 1535 may include data that may be used in these embodiments (e.g., recorded communications, profiles for different modes of operations, etc.). In other embodiments, other or different software elements and data may be included.

A person of ordinary skill in the art will appreciate that computer system 1500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
performing, via a first communication device:
sequentially scanning a plurality of frequency subbands for one or more beacons transmitted by a second communication device following a superframe structure, the superframe structure having a plurality of beacon slots, a plurality of Contention Access Period (CAP) slots following the plurality of beacon slots, and a Contention Free Period (CFP) slot following the plurality of CAP slots, each of the plurality of beacon slots and each of the plurality of CAP slots corresponding to a respective one of the plurality of frequency subbands, and the CFP slot corresponding to a combination of the plurality of frequency subbands;
in response to having received the one or more beacons, communicating with the second communication device following the superframe structure;
receiving data from the second communication device over the first of the plurality of frequency subbands during a first CAP slot corresponding to the first frequency subband; and
transmitting an acknowledgement message to the second communication device over the second of the plurality of frequency subbands during the first CAP slot.

2. The method of claim 1, wherein communicating with the second communication device further comprises:
performing, via the first communication device,
in response to having received the one or more beacons, creating a downlink subband report;
transmitting the downlink subband report over each of the plurality of frequency subbands during respective ones of the plurality of CAP slots to the second communication device; and
receiving a subband allocation message from the second communication device, the subband allocation message identifying a first of the plurality of frequency subbands as suitable for subsequent downlink communications and identifying a second of the plurality of frequency subbands as suitable for subsequent uplink communications.

3. The method of claim 2, further comprising:
performing, via the first communication device,
transmitting data to the second communication device over the second of the plurality of frequency subbands during a second CAP slot corresponding to the second frequency subband; and
receiving an acknowledgement message from the second communication device over the first of the plurality of frequency subbands during the second CAP slot.

4. The method of claim 2, further comprising:
performing, via the first communication device,
receiving a poll request from the second communication device over the first of the plurality of frequency subbands during the CFP slot; and
in response to the poll request, transmitting a data packet to the second communication device over the second of the plurality of frequency subbands during the CFP slot.

5. The method of claim 4, further comprising:
performing, via the first communication device,
in response to transmitting the data packet, receiving an acknowledgement message from the second communication device over the first of the plurality of frequency subbands.

6. The method of claim 1, wherein the first communication device is a first-level, low-voltage (LV) Power Line Communications (PLC) device, and wherein the second communication device is a medium-voltage (MV) PLC device.

7. The method of claim 1, further comprising:
performing, via the first communication device,
in response to not having received the one or more beacons, simultaneously scanning the plurality of frequency subbands for one or more other beacons transmitted by a third communication device; and
in response to having received the one or more other beacons, communicating with the third communication device during a transmit period indicated by the one or more other beacons.

8. The method of claim 7, wherein the transmit period specifies a period of time during which the first communication device is allowed to transmit messages to the third communication device.

9. The method of claim 8, wherein the period of time is finite, wherein the first communication device is a lower-level, low-voltage (LV) Power Line Communications (PLC) device, and wherein the third communication device is a first-level, LV PLC device.

10. The method of claim 8, wherein the period of time is set to infinity, wherein the first communication device is a lower-level, low-voltage (LV) Power Line Communications (PLC) device, and wherein the third communication device is another lower-level, LV PLC device.

11. The method of claim 7, wherein the transmit period specifies a period of time during which the first communication device is prohibited from transmitting messages to the third communication device.

12. The method of claim 7, further comprising:
performing, via the first communication device,
in response to not having received the one or more other beacons, transmitting a first beacon; and
receiving a second beacon from the third communication device, the second beacon indicating a transmit period.

13. The method of claim 12, wherein the transmit period is finite, wherein the first communication device is a lower-level, low-voltage (LV) Power Line Communications (PLC) device, and wherein the third communication device is a first-level, LV PLC device.

14. The method of claim 12, wherein the transmit period is set to infinity, wherein the first communication device is a lower-level, low-voltage (LV) Power Line Communications (PLC) device, and wherein the third communication device is another lower-level, LV PLC device.

15. A Power Line Communications (PLC) device, comprising:
a processor; and
a memory coupled to the processor, the memory configured to store program instructions executable by the processor to cause the PLC device to:
sequentially scan a plurality of frequency subbands for one or more beacons transmitted by a second PLC device following a superframe structure, the superframe structure having a plurality of beacon slots, a plurality of Contention Access Period (CAP) slots following the plurality of beacon slots, and a Contention Free Period (CFP) slot following the plurality of CAP slots, each of the plurality of beacon slots and each of the plurality of CAP slots corresponding to a respective one of the plurality of frequency subbands, and the CFP slot corresponding to a combination of the plurality of frequency subbands;

in response to having received the one or more beacons, communicate with the second PLC device following the superframe structure;

transmit data to the second PLC device over the second of the plurality of frequency subbands during a second CAP slot corresponding to the second frequency subband; and receive an acknowledgement message from the second PLC device over the first of the plurality of frequency subbands during the second CAP slot.

16. The PLC device of claim 15, wherein the processor includes a digital signal processor (DSP), an application specific integrated circuit (ASIC), a system-on-chip (SoC) circuit, a field-programmable gate array (FPGA), a microprocessor, or a microcontroller.

17. The PLC device of claim 15, wherein the program instructions are executable by the processor to further cause the PLC device to:

in response to not having received the one or more beacons, simultaneously scan the plurality of frequency subbands for one or more other beacons transmitted by a third PLC device; and in response to having received the one or more other beacons, communicate with the third communication device.

18. The PLC device of claim 17, wherein the program instructions are executable by the processor to further cause the PLC device to:

in response to not having received the one or more other beacons, transmit a first beacon;

receive a second beacon from the third communication device; and in response to having received the second beacon, communicate with the third communication device.

19. A non-transitory electronic storage medium having program instructions stored thereon that, upon execution by a processor within a Power Line Communication (PLC) device, cause the PLC device to:

sequentially scan a plurality of frequency subbands for one or more beacons transmitted by a second PLC device following a superframe structure, the superframe structure having a plurality of beacon slots, a plurality of Contention Access Period (CAP) slots following the plurality of beacon slots, and a Contention Free Period (CFP) slot following the plurality of CAP slots, each of the plurality of beacon slots and each of the plurality of CAP slots corresponding to a respective one of the plurality of frequency subbands, and the CFP slot corresponding to a combination of the plurality of frequency subbands;

in response to having received the one or more beacons, communicate with the second PLC device following the superframe structure;

receive a poll request from the second communication device over the first of the plurality of frequency subbands during the CFP slot; and in response to the poll request, transmit a data packet to the second communication device over the second of the plurality of frequency subbands during the CFP slot.

20. A method, comprising:

performing, via a first communication device:

sequentially scanning a plurality of frequency subbands for one or more beacons transmitted by a second communication device following a superframe structure, the superframe structure having a plurality of beacon slots, a plurality of Contention Access Period (CAP) slots following the plurality of beacon slots, and a Contention Free Period (CFP) slot following the plurality of CAP slots, each of the plurality of beacon slots and each of the plurality of CAP slots corresponding to a respective one of the plurality of frequency subbands, and the CFP slot corresponding to a combination of the plurality of frequency subbands;

in response to not having received the one or more beacons, simultaneously scanning the plurality of frequency subbands for one or more other beacons transmitted by a third communication device; and in response to having received the one or more other beacons, communicating with the third communication device during a transmit period indicated by the one or more other beacons, wherein the transmit period specifies a period of time during which the first communication device is allowed to or prohibited from transmitting messages to the third communication device.

* * * * *